United States Patent
Kita et al.

(10) Patent No.: US 9,025,905 B2
(45) Date of Patent: May 5, 2015

(54) IMAGE PROCESSING APPARATUS, RECORDING MEDIUM STORING IMAGE PROCESSING PROGRAM, AND METHOD OF IMAGE PROCESSING

(71) Applicants: Koji Kita, Wakayama (JP); Yukiko Murata, Wakayama (JP); Takahiro Miyamoto, Wakayama (JP); Yumiko Nakagawa, Wakayama (JP); Tomoo Nakano, Wakayama (JP)

(72) Inventors: Koji Kita, Wakayama (JP); Yukiko Murata, Wakayama (JP); Takahiro Miyamoto, Wakayama (JP); Yumiko Nakagawa, Wakayama (JP); Tomoo Nakano, Wakayama (JP)

(73) Assignee: NK Works Co., Ltd. (JP)

( * ) Notice: Subject to any disclaimer, the term of this patent is extended or adjusted under 35 U.S.C. 154(b) by 99 days.

(21) Appl. No.: 13/738,617

(22) Filed: Jan. 10, 2013

(65) Prior Publication Data
US 2013/0177256 A1   Jul. 11, 2013

(30) Foreign Application Priority Data
Jan. 11, 2012   (JP) ................................ 2012-002805

(51) Int. Cl.
*G06K 9/40* (2006.01)
*G06T 5/00* (2006.01)

(52) U.S. Cl.
CPC ................ *G06T 5/002* (2013.01); *G06T 5/003* (2013.01); *G06T 2207/10016* (2013.01); *G06T 2207/20192* (2013.01)

(58) Field of Classification Search
CPC ...... H04N 5/2355; G06T 5/002; G06T 5/003; G06T 7/0006; G06T 7/0044; G06T 7/0085; G06T 2207/10016; G06T 2207/10061; G06T 2207/20192; G06T 2207/30121; G06T 2207/30148; G06K 9/46
USPC .......... 382/199, 254, 266, 269, 274, 260, 263
See application file for complete search history.

(56) References Cited

U.S. PATENT DOCUMENTS

| 5,600,734 | A  | * | 2/1997 | Okubo et al. ................. 382/147 |
| 5,929,908 | A  | * | 7/1999 | Takahashi et al. ............ 348/364 |
| 7,358,988 | B1 | * | 4/2008 | Konishi et al. ............. 348/222.1 |
| 2009/0034003 | A1 | * | 2/2009 | Makino .......................... 358/3.1 |
| 2013/0177256 | A1 | * | 7/2013 | Kita et al. ..................... 382/266 |

FOREIGN PATENT DOCUMENTS

| JP | H06311425 A | 11/1994 |
| JP | 2008278354 A | 11/2008 |
| JP | 2010010798 A | 1/2010 |

OTHER PUBLICATIONS

Notice of Reasons for Rejection from Jpo Application No. 2012-002805 Mailing Date: Jan. 6, 2015 7 pp.

* cited by examiner

*Primary Examiner* — Ali Bayat
(74) *Attorney, Agent, or Firm* — St. Onge Steward Johnston & Reens LLC (57) ABSTRACT

An image processing apparatus including a first image processing unit and a second image processing unit. The first image processing unit is configured to calculate a parameter for image processing based on a first image, but not based on a second image, and execute the image processing on the first image using the parameter. The second image processing unit is configured to execute the image processing on the second image using the parameter.

15 Claims, 7 Drawing Sheets

IMAGE PROCESSING APPARATUS, RECORDING MEDIUM STORING IMAGE PROCESSING PROGRAM, AND METHOD OF IMAGE PROCESSING

FIELD OF THE INVENTION

The present invention relates to an image processing apparatus, a recording medium storing an image processing program, and a method of image processing.

BACKGROUND OF THE INVENTION

Conventionally, there are cases where it is desired to execute the same image processing on a plurality of images. For example, in order to correct images contained in a moving image for shaking, JP 2010-10798A discloses a technology that calculates parameters for image processing at respective times of day from images at the respective times of day and corrects the images at the respective times of day using the parameters for image processing at the respective times of day.

However, according to JP 2010-10798A, with respect to a plurality of images on which the same image processing is to be executed, parameters for that image processing are calculated separately. It should be noted that "the same image processing" as used herein means image processing that is realized by the same algorithm and includes cases where different parameters are used. In that case, there is a possibility that an enormous amount of computation time is taken to execute the image processing on the plurality of images. This problem is especially noticeable when image processing parameter calculation is a high-load process.

It is an object of the present invention to provide an image processing apparatus, a recording medium storing an image processing program, and a method of image processing that can reduce computation time taken to execute the same image processing on a plurality of images.

SUMMARY OF THE INVENTION

An image processing apparatus according to a first aspect includes a first image processing unit and a second image processing unit. The first image processing unit is configured to calculate a parameter for image processing based on a first image, but not based on a second image, and execute the image processing on the first image using the parameter. The second image processing unit is configured to execute the image processing on the second image using the parameter.

Here, the same image processing is executed on the first image and the second image. In addition, the parameter for use in the image processing of both of the images is calculated from only the first image of the first and second images. In other words, the parameter calculated from the first image for use in the image processing of the first image is also used for the image processing of the second image. It should be noted that as the manner of making use of the parameter calculated from the first image for the second image, a manner in which the parameter calculated from the first image is used as it is for the image processing of the second image, a manner in which the parameter calculated from the first image is fine-tuned before being used for the image processing of the second image, and the like are conceivable. That is to say, processing for calculating a parameter for use in the image processing of the second image is omitted or simplified. Accordingly, computation time taken to execute the same image processing on a plurality of images is reduced.

An image processing apparatus according to a second aspect is the image processing apparatus according to the first aspect, wherein the first image and the second image are images on the same timeline.

In many cases, it may be appropriate to execute the same image processing using the same parameter on a plurality of images that is at least a part of images belonging to the same timeline. This is because those images are highly likely to have been taken under similar conditions. Here, it is possible to execute the same image processing using the same parameter on the first image and the second image that are on the same timeline. Accordingly, it is possible to obtain appropriate images while increasing the speed of image processing.

An image processing apparatus according to a third aspect is the image processing apparatus according to the first aspect, wherein the first image and the second image are images on different timelines.

There are cases where it is appropriate to execute the same image processing using the same parameter on a plurality of images belonging to different timelines. For example, this holds in the case where those images have been taken by the same camera installed at the same location. Here, it is possible to execute the same image processing using the same parameter on the first image and the second image that are on different timelines. Accordingly, it is possible to obtain appropriate images while increasing the speed of image processing.

Image processing apparatuses according to fourth through sixth aspects are, respectively, the image processing apparatuses according to the first through third aspects, wherein the parameter includes an extent of blurring. The image processing includes processing for enhancing an edge.

Here, the processing for enhancing edges in not only the first image but also the second image is executed using the extent of blurring of the first image that has been estimated from the first image. The extent of blurring is expressed as, for example, a point spread function (PSF). The extent of blurring is a parameter that depends on the properties of lenses of a camera when it is resulted from in defocusing. Therefore, if the first and the second images are images taken by the same camera, the extent of blurring estimated from the first image can be applied to the second image. Here, it is possible to obtain appropriate images while increasing the speed of edge enhancement processing of a plurality of images that have been taken under similar conditions, when the same camera was used to take those images or the like.

Image processing apparatuses according to seventh through ninth aspects are, respectively, the image processing apparatuses according to the first through third aspects, wherein the parameter includes at least one of noise information, distortion aberration information, and peripheral illumination information. The image processing includes processing for removing noise, processing for adding noise, processing for correcting for distortion aberration, and processing for correcting for peripheral illumination.

Here, at least one of the processing for removing noise, processing for adding noise, processing for correcting for distortion aberration, and processing for correcting for peripheral illumination of not only the first image but also the second image is executed using at least one of the noise information, distortion aberration information, and peripheral illumination information on the first image that has been estimated from the first image. The noise information, distortion aberration information, and peripheral illumination information are parameters that depend on shooting conditions such as the camera, shooting time of day, and shooting location. Accordingly, it is possible to obtain appropriate images while increasing the speed of the noise removal processing, the distortion aberration correction processing, and the peripheral illumination correction processing of a plurality of images taken under similar conditions.

Image processing apparatuses according to tenth through fourteenth aspects are, respectively, the image processing apparatuses according to the first, second, third, fourth and seventh aspects, and further includes an instruction receiving unit. The instruction receiving unit is configured to receive an instruction to execute the image processing on the first image and the second image. The first image processing unit is configured to calculate the parameter and execute the image processing on the first image in response to the instruction. The second image processing unit is configured to execute the image processing on the second image when the parameter has been calculated.

Here, when the user gives an instruction to execute the image processing, the parameter for the image processing is automatically calculated, and the image processing is automatically executed on the first and the second images. Accordingly, the waiting time for the user from when the user gives the instruction to execute the image processing until when the image processing is completed is reduced.

A non-transitory computer-readable recording medium according to a fifteenth aspect is a recording medium storing an image processing program configured to cause a computer to execute a first image processing step and a second image processing step. The first image processing step is a step of calculating a parameter for image processing based on a first image, but not based on a second image, and executing the image processing on the first image using the parameter. The second image processing step is a step of executing the image processing on the second image using the parameter.

Here, the same image processing is executed on the first image and the second image. In addition, the parameter for use in the image processing of both of the images is calculated from only the first image of the first and second images. In other words, the parameter calculated from the first image for use in the image processing of the first image is also used for the image processing of the second image. It should be noted that as the manner of making use of the parameter calculated from the first image for the second image, a manner in which the parameter calculated from the first image is used as it is for the image processing of the second image, a manner in which the parameter calculated from the first image is fine-tuned before being used for the image processing of the second image, and the like are conceivable. That is to say, processing for calculating a parameter for use in the image processing of the second image is omitted or simplified. Accordingly, computation time taken to execute the same image processing on a plurality of images is reduced.

A non-transitory computer-readable recording medium according to a sixteenth aspect is the recording medium according to the fifteenth aspect, wherein the parameter includes an extent of blurring. The image processing includes processing for enhancing an edge.

Here, the processing for enhancing edges in not only the first image but also the second image is executed using the extent of blurring of the first image that has been estimated from the first image. The extent of blurring is expressed as, for example, a point spread function (PSF). The extent of blurring is a parameter that depends on the properties of lenses of a camera when it is resulted from in defocusing. Therefore, if the first and the second images are images taken by the same camera, the extent of blurring estimated from the first image can be applied to the second image. Here, it is possible to obtain appropriate images while increasing the speed of edge enhancement processing of a plurality of images that have been taken under similar conditions, when the same camera was used to take those images or the like.

A non-transitory computer-readable recording medium according to a seventeenth aspect is the recording medium according to the fifteenth aspect, wherein the parameter includes at least one of noise information, distortion aberration information, and peripheral illumination information. The image processing includes processing for removing noise, processing for adding noise, processing for correcting for distortion aberration, and processing for correcting for peripheral illumination.

Here, at least one of the processing for removing noise, processing for adding noise, processing for correcting for distortion aberration, and processing for correcting for peripheral illumination of not only the first image but also the second image is executed using at least one of the noise information, distortion aberration information, and peripheral illumination information on the first image that has been estimated from the first image. The noise information, distortion aberration information, and peripheral illumination information are parameters that depend on shooting conditions such as the camera, shooting time of day, and shooting location. Accordingly, it is possible to obtain appropriate images while increasing the speed of the noise removal processing, the distortion aberration correction processing, and the peripheral illumination correction processing of a plurality of images taken under similar conditions.

A method of image processing according to an eighteenth aspect includes a first image processing step and a second image processing step. The first image processing step is a step of calculating a parameter for image processing based on a first image, but not based on a second image, and executing the image processing on the first image using the parameter. The second image processing step is a step of executing the image processing on the second image using the parameter.

Here, the same image processing is executed on the first image and the second image. In addition, the parameter for use in the image processing of both of the images is calculated from only the first image of the first and second images. In other words, the parameter calculated from the first image for use in the image processing of the first image is also used for the image processing of the second image. It should be noted that as the manner of making use of the parameter calculated from the first image for the second image, a manner in which the parameter calculated from the first image is used as it is for the image processing of the second image, a manner in which the parameter calculated from the first image is fine-tuned before being used for the image processing of the second image, and the like are conceivable. That is to say, processing for calculating a parameter for use in the image processing of the second image is omitted or simplified. Accordingly, computation time taken to execute the same image processing on a plurality of images is reduced.

A method of image processing according to a nineteenth aspect is the method according to the eighteenth aspect, wherein the parameter includes an extent of blurring. The image processing includes processing for enhancing an edge.

Here, the processing for enhancing edges in not only the first image but also the second image is executed using the extent of blurring of the first image that has been estimated from the first image. The extent of blurring is expressed as, for example, a point spread function (PSF). The extent of blurring is a parameter that depends on the properties of lenses of a camera when it is resulted from in defocusing. Therefore, if the first and the second images are images taken by the same camera, the extent of blurring estimated from the first image can be applied to the second image. Here, it is possible to obtain appropriate images while increasing the speed of edge enhancement processing of a plurality of images that have been taken under similar conditions, when the same camera was used to take those images or the like.

A method of image processing according to a twentieth aspect is the method according to the eighteenth aspect, wherein the parameter includes at least one of noise information, distortion aberration information, and peripheral illumination information. The image processing includes processing for removing noise, processing for adding noise, processing for correcting for distortion aberration, and processing for correcting for peripheral illumination.

Here, at least one of the processing for removing noise, processing for adding noise, processing for correcting for distortion aberration, and processing for correcting for peripheral illumination of not only the first image but also the second image is executed using at least one of the noise information, distortion aberration information, and peripheral illumination information on the first image that has been estimated from the first image. The noise information, distortion aberration information, and peripheral illumination information are parameters that depend on shooting conditions such as the camera, shooting time of day, and shooting location. Accordingly, it is possible to obtain appropriate images while increasing the speed of the noise removal processing, the distortion aberration correction processing, and the peripheral illumination correction processing of a plurality of images taken under similar conditions.

Advantageous Effects of Invention

According to the present invention, the parameter that has been calculated from the first image for use in the image processing of the first image is also used for the image processing of the second image. That is to say, processing for calculating a parameter for use in the image processing of the second image is omitted or simplified. Accordingly, computation time taken to execute the same image processing on a plurality of images is reduced.

REFERENCE SIGNS LIST

1 Image processing apparatus (computer)
2 Image processing program
41 Image processing unit
41-L Lth image processing unit
42 Instruction receiving unit

DETAILED DESCRIPTION OF THE INVENTION

Hereinafter, an image processing apparatus, a recording medium storing an image processing program, and a method of image processing according to an embodiment of the present invention will be described with reference to the drawings.

1. Brief Outline of Image Processing Apparatus

Figure 1:
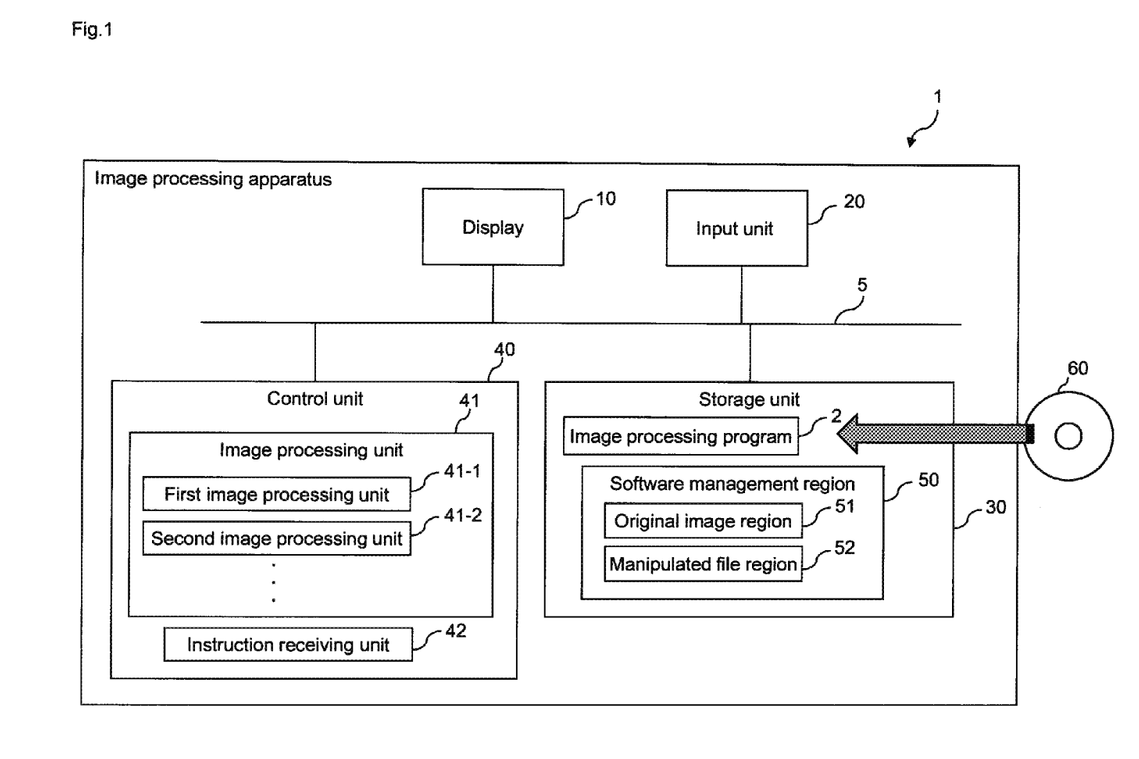
FIG. 1 is a block diagram of an image processing apparatus according to an embodiment of the present invention.

An image processing apparatus 1 shown in FIG. 1 is an embodiment of an image processing apparatus according to the present invention. The image processing apparatus 1 is a general-purpose personal computer. An image processing program 2, which is an embodiment of an image processing program according to the present invention, is installed in the image processing apparatus 1 from a computer-readable recording medium 60 such as a CD-ROM, a DVD-ROM, a Blu-ray disc, a USB memory, or the like. The image processing program 2 is application software for assisting image processing of moving images and still images. The image processing program 2 causes the image processing apparatus 1 to execute steps contained in an operation that will be described later.

The image processing apparatus 1 has a display 10, an input unit 20, a storage unit 30, and a control unit 40. The display 10, the input unit 20, the storage unit 30, and the control unit 40 are connected to one another by a bus line 5 and can communicate with one another. In the present embodiment, the display 10 may be a liquid crystal display. The input unit 20 may be composed of a mouse, a keyboard, and the like. The storage unit 30 may be composed of a hard disk and the like. The control unit 40 may be composed of a CPU, a ROM, a RAM, and the like.

The display 10 displays screens that will be described later and the like to a user. The input unit 20 receives a user operation on the image processing apparatus 1.

The image processing program 2 is stored in the storage unit 30. A software management region 50 is set aside in the storage unit 30. The software management region 50 is a region that is used by the image processing program 2. An original image region 51 and a manipulated file region 52 are set aside in the software management region 50. The functions of these regions 51 and 52 will be described later.

The control unit 40 reads out and executes the image processing program 2 stored in the storage unit 30, thereby virtually operating as an image processing unit 41 and an instruction receiving unit 42. The operations of these units 41 and 42 will be described later.

2. Details of Configuration and Operation of Image Processing Apparatus

When the control unit 40 detects that the user has performed a predetermined operation through the input unit 20, the control unit 40 activates the image processing program 2. When the image processing program 2 is activated, a basic screen W1 (see FIG. 2) is displayed on the display 10. It should be noted that the control unit 40 controls the display of screens, windows, buttons, and all other elements displayed on the display 10.

2-1. Image Data Capture

Figure 2:
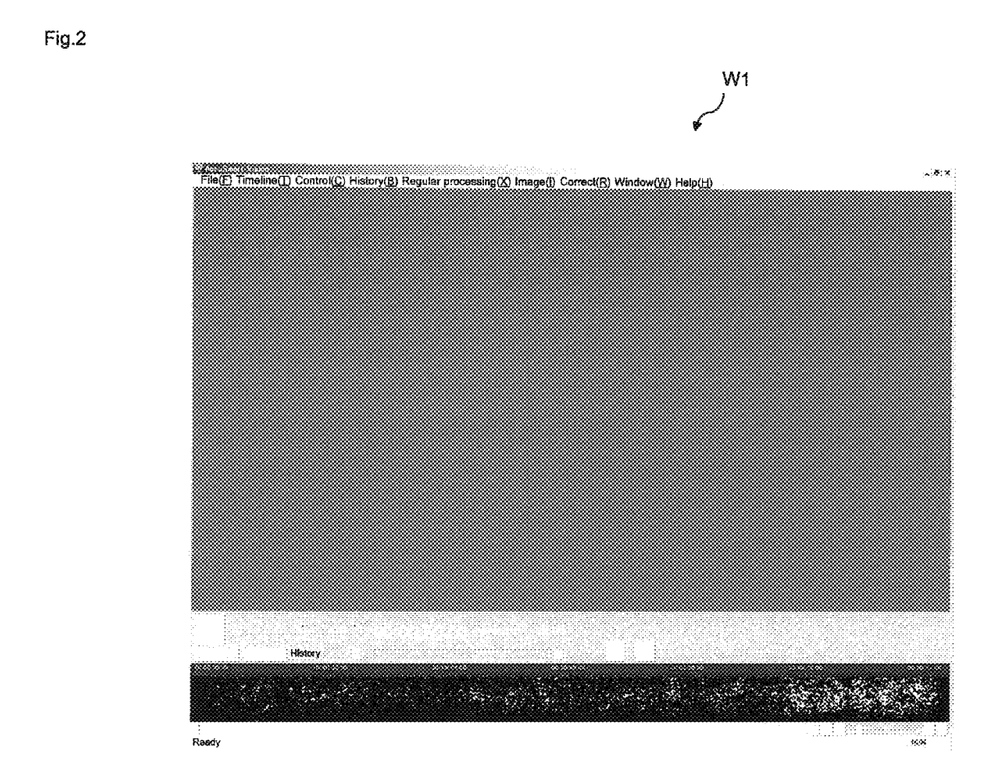
FIG. 2 shows a basic screen before image data is captured.

The basic screen W1 receives a command from the user to capture image data into the original image region 51. The image data captured into the original image region 51 will be a target of image processing that will be described later. The control unit 40 captures image data from a still image file or a moving image file into the original image region 51. It should be noted that in this specification, "still image file" refers to a data file in a still image format, and "moving image file" refers to a data file in a moving image format.

When capturing image data from a still image file, the user designates a still image file or a folder by operating the input unit 20. In the former case, the control unit 40 prompts the user to input an address path in the storage unit 30 and a file name of that still image file. In the latter case, the control unit 40 prompts the user to input an address path in the storage unit 30 and a folder name of that folder. After that, the control unit 40 stores the designated still image file or all the still image files within the designated folder in the original image region 51 as a still image file group. It should be noted that "group" as used herein is not limited to a plurality of elements, and the number of elements of the group may be one.

On the other hand, when capturing image data from a moving image file, the user inputs an address path in the storage unit 30 and a file name of a moving image file by operating the input unit 20. When the control unit 40 detects that the user has designated the moving image file, the control unit 40 displays a moving image capture window (not shown) such that this window is laid on the basic screen W1. The moving image capture window receives, from the user, the selection of a timeline of any length out of the entire timeline of the designated moving image file. When the control unit 40 detects that the user has selected the timeline of any length through the input unit 20, the control unit 40 generates a still image file group corresponding to that selection. This still image file group corresponds one-to-one to a frame group that is contained in a moving image of the timeline selected by the user. Afterward, the control unit 40 stores this still image file group in the original image region 51.

Accordingly, in the present embodiment, the target of image processing that will be described later is not a moving image file but a still image file. The still image file is captured into the original image region 51 on a file-by-file basis, on a folder-by-folder basis, or in the unit of the whole or a partial timeline of the moving image file.

2-2. Reproduction of Still Image File Group

When the still image file group is captured into the original image region 51, the control unit 40 displays a display window W2 (see FIG. 3) such that this window is laid on the basic screen W1. The display windows W2 is displayed for each capturing operation for capturing a still image file group into the original image region 51.

Figure 3:
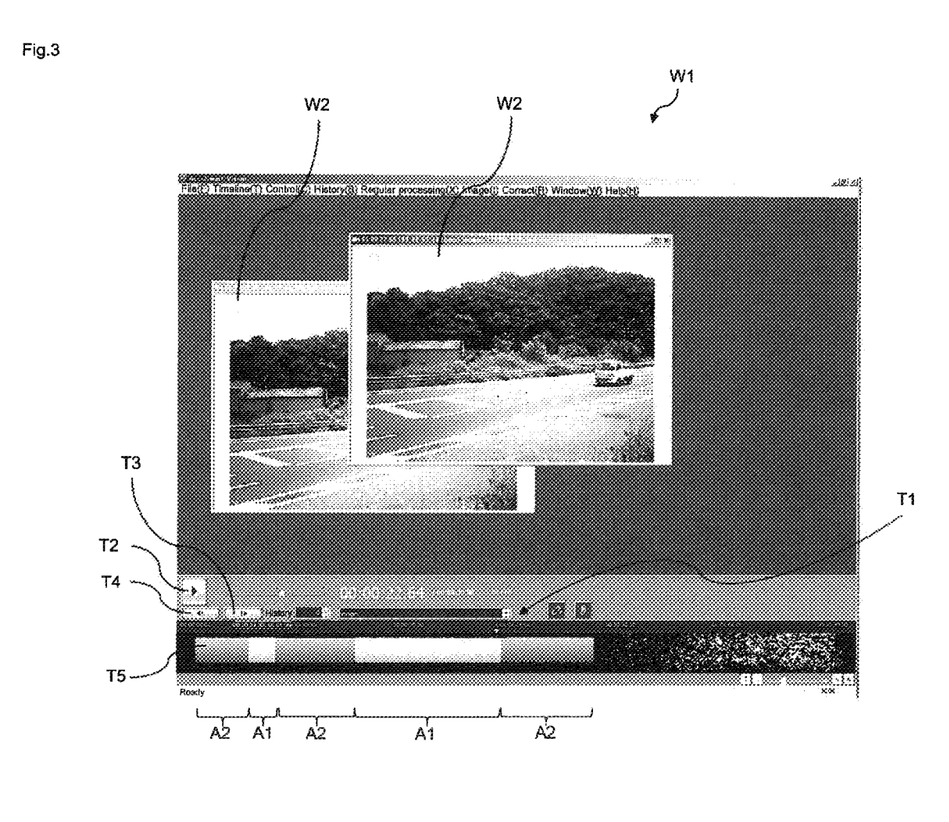
FIG. 3 shows the basic screen after image data has been captured.

In the display window W2, first, a single still image file (for example, a still image file corresponding to the leading frame on the timeline) contained in the still image file group that has been captured into the original image region 51 is displayed. It should be noted that the control unit 40 recognizes that still image files contained in the still image file group are arranged along the timeline, even if the still image file group is derived from a still image file rather than being derived from a moving image file. The arrangement is automatically determined based on the attributes (file name, date and time of creation, date and time of update, and the like) of a file.

As will be described later, the frame displayed in the display window W2 changes in response to a user operation. The control unit 40 manages identification information of the frame that is currently displayed in the display window W2 in real time.

The control unit 40 can reproduce, within the display window W2, the still image file group corresponding to that display window W2 as a moving image. As shown in FIG. 3, the control unit 40 displays a window selection pull-down menu T1, a reproduce button T2, a frame forward button T3, a frame back button T4, and a timeline bar T5 on the basic screen W1.

Even when there is a plurality of display windows W2, only one of those display windows W2 is active. The window selection pull-down menu T1 receives the selection of which display window W2 is to be made active from the user. Hereinafter, a still image file group corresponding to an active display window W2 will be referred to as "active file group". Moreover, a frame that is currently displayed in an active display window W2 will be referred to as "active display frame".

The reproduce button T2 receives a command from the user to reproduce the active file group as a moving image. When the control unit 40 detects that the user has pressed the reproduce button T2 through the input unit 20, the control unit 40 displays frames of the active file group in the active display window W2 in such a manner that the frames are sequentially displayed along the timeline. It should be noted that the reproduction begins with an active display frame at the point in time when the reproduce button T2 is pressed. Moreover, the reproduce button T2 receives a command from the user to stop reproduction. When the control unit 40 detects that the user has pressed the reproduce button T2 through the input unit 20 during reproduction, the control unit 40 fixes the display in the active display window W2 to an active display frame at that point in time.

The frame forward button T3 and the frame back button T4 respectively receive commands from the user to change the active display frame to a frame directly after and directly before that active display frame along the timeline of the active file group.

The timeline bar T5 graphically represents the timeline of the active file group. The timeline bar T5 is equally divided in an extending direction of the bar into the same number of parts as the number of frames of the active file group. An "n"th divided region from the left on the timeline bar T5 corresponds to an "n"th frame of the active file group on the timeline ("n" is a natural number).

As shown in FIG. 3, in the timeline bar T5, divided regions A1 corresponding to a selected frame group and divided regions A2 corresponding to a non-selected frame group are displayed differently. "Selected frame group" refers to a frame group corresponding to a section that is currently selected on the timeline of the active file group. "Non-selected frame group" refers to a frame group corresponding to a section that is not currently selected on the timeline of the active file group. In the present embodiment, the region A1 is displayed in a light tone of color, and the region A2 is displayed in a dark tone of color.

The timeline bar T5 receives the selection of any section of the active file group on the timeline from the user. The section that is selected may be a continuous section or may be a discontinuous section. In other words, the user can select any number of any frames out of all the frames of the active file group by operating the timeline bar T5 through the input unit 20. Specifically, the user selects a divided region corresponding to a frame that he/she desires to select on the timeline bar T5. It is possible to select a plurality of divided regions at the same time. The image processing unit 41 recognizes the selected frame group as the target of image processing that will be described later. It should be noted that each time the user selects a divided region on the timeline bar T5, the active display frame is changed to a frame corresponding to the latest selected divided region.

2-3. Image Processing

Hereinafter, image processing of the selected frame group will be described. The image processing unit 41 can execute a plurality of image processing modules, such as noise removal, noise addition, sharpness, brightness/contrast/saturation adjustment, image resolution, rotation, addition of characters/arrows/mosaics, distortion aberration correction, peripheral illumination correction, and blur correction. The image processing modules are incorporated in the image processing program 2.

The instruction receiving unit 42 receives an instruction from the user to execute image processing. The user can select any modules of the image processing modules in any order and any number of times by operating the basic screen W1 through the input unit 20. If necessary, the user inputs a parameter that is used during execution of an image processing module at the same time as he/she selects that image processing module. Each time the instruction receiving unit 42 detects that the user has selected an image processing module, the image processing unit 41 executes that image processing module on the selected frame group. It should be noted that executing an image processing module on a selected frame group means executing that image processing module on each frame contained in that selected frame group.

As image processing modules are executed on a frame sequentially, that is, once, twice, thrice, and so on, that frame is sequentially manipulated into a first-order frame, a second-order frame, a third-order frame, and so on. A zeroth-order frame corresponds to a still image file stored in the original image region 51. An (m+1)th-order frame corresponds to a still image file after an image processing module is executed once on an "m"th-order frame ("m" is an integer of 0 or more). As image processing modules are sequentially executed, still image files corresponding to the first-order and subsequent frames are sequentially generated. These still image files are stored in the manipulated file region 52 as separate files.

2-3-1. Blur Correction

Details of image processing for blur correction (hereinafter referred to as "blur correction process") will be described below. As described above, the instruction receiving unit 42 receives an instruction from the user to execute the blur correction process. The image processing unit 41 starts the blur correction process illustrated in FIG. 5 on a selected frame group in response to the user instruction to execute the blur correction process.

Specifically, when the control unit 40 detects that the user has performed a predetermined operation on the basic screen W1 through the input unit 20, the control unit 40 displays a confirmation window W3 (see FIG. 4) such that this window is laid on the basic screen W1. Processing of steps S22 and S23, which will be described later, included in the blur correction process is high-load processing. Accordingly, when the blur correction process is started, any other process may be retarded. The confirmation window W3 is a window that displays a warning that the blur correction process takes time to the user and asks the user whether or not to still execute the blur correction process.

Figure 4:
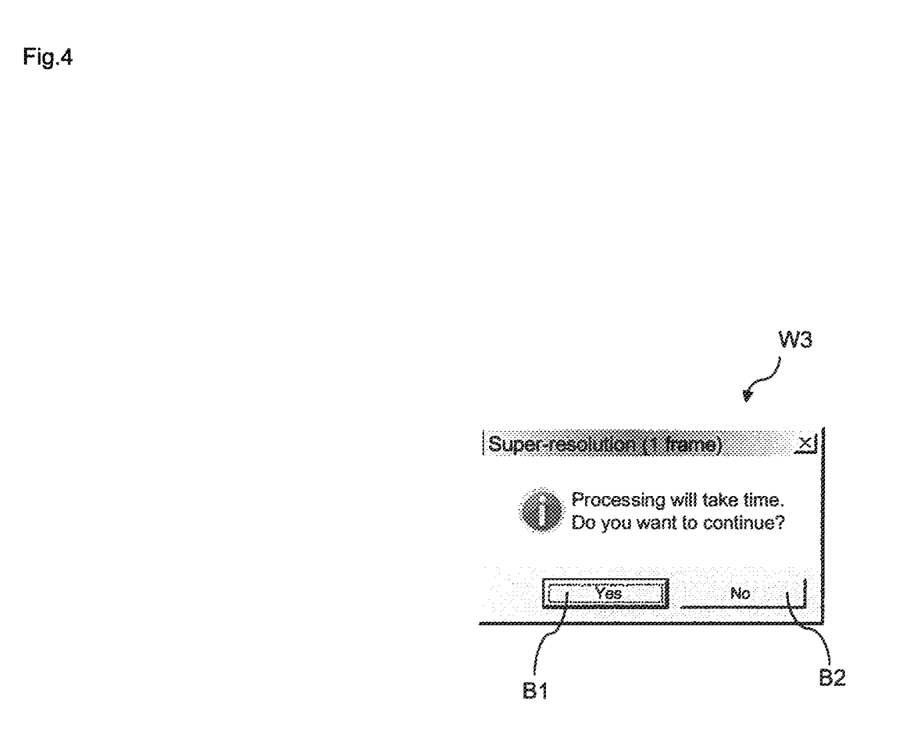
FIG. 4 shows a confirmation window.

The confirmation window W3 displays an execution button B1 and a cancel button B2. The instruction receiving unit 42 receives an instruction from the user to execute the blur correction process through the execution button B1. The instruction receiving unit 42 receives an instruction from the user to cancel execution of the blur correction process through the cancel button B2. When the instruction receiving unit 42 detects that the user has pressed the execution button B1 through the input unit 20, the image processing unit 41 starts the blur correction process illustrated in FIG. 5.

Specifically, the image processing unit 41 sequentially executes processing of step S2 on all the frames contained in the selected frame group. Processing of step S2 is the processing for executing a blur correction image processing module. In step S1 before step S2, a single frame that is the leading frame along the timeline among frames that are contained in the selected frame group and have not yet undergone processing of step S2 is selected as a frame (hereinafter referred to as "target frame") that is a target of processing of step S2. Therefore, in the blur correction process illustrated in FIG. 5, processing of steps S1 and S2 is executed K times (K is an integer of 1 or more). K represents the number of frames contained in a selected frame group.

Figure 5:
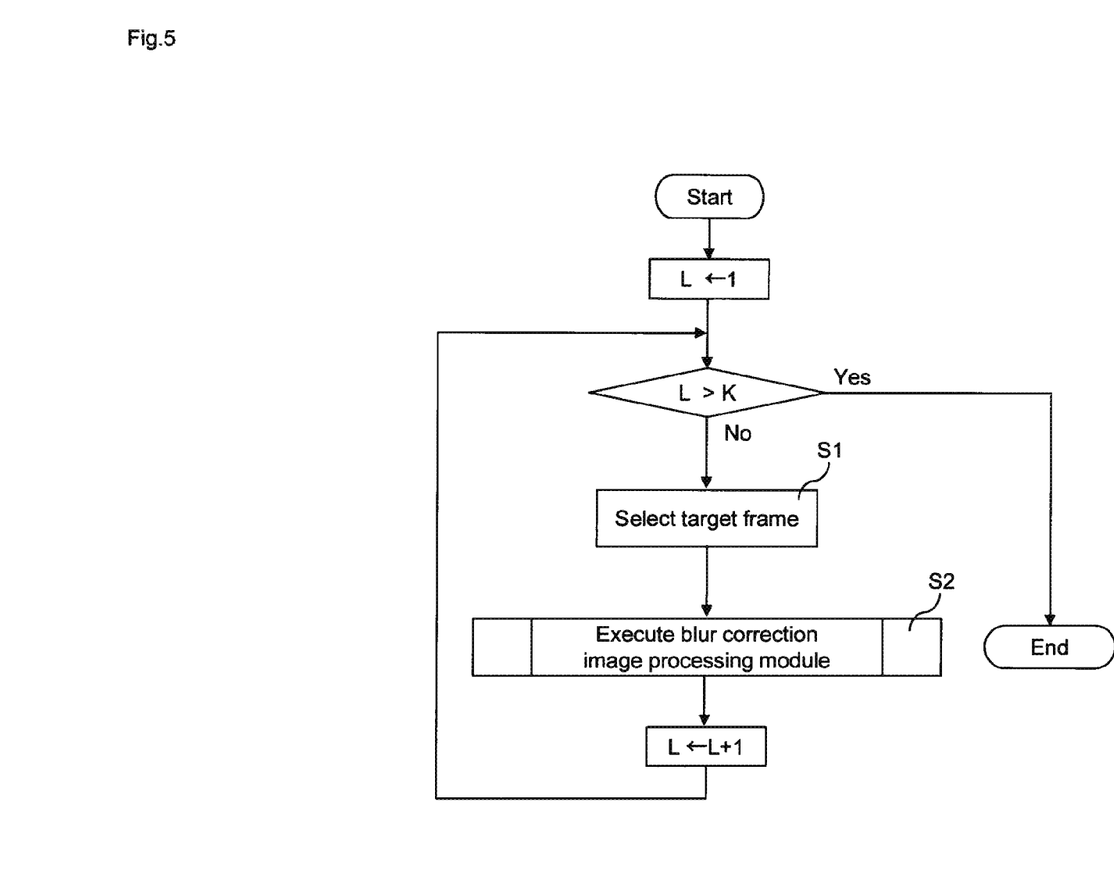
FIG. 5 is a flowchart of a blur correction process to be executed on a selected frame group.

When an Lth cycle of step S2 is executed, that is, when the target frame is an Lth frame, the image processing unit 41 operates as an Lth image processing unit 41-L (L is a natural number). The Lth frame refers to a frame that is selected in an Lth cycle of step S1.

Figure 6:
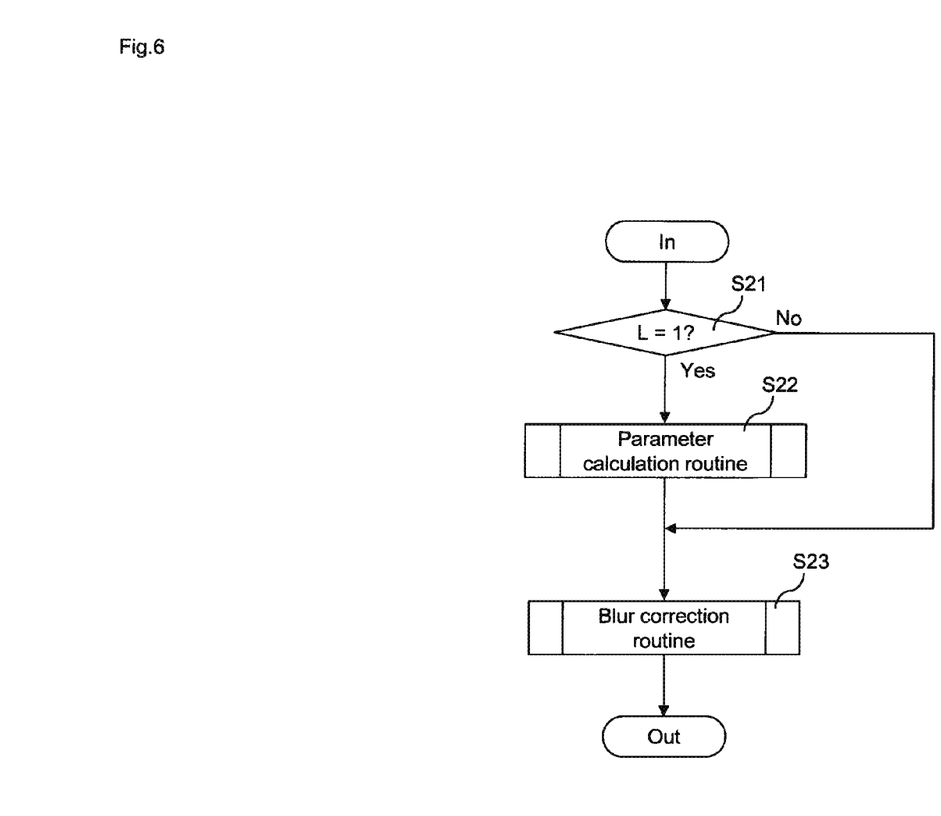
FIG. 6 is a flowchart of the blur correction process to be executed on each frame.

FIG. 6 illustrates details of processing of step S2 in FIG. 5. First, in step S21, the Lth image processing unit 41-L determines whether or not the target frame is the first frame. If the Lth image processing unit 41-L determines that the target frame is the first frame, the process is advanced to step S22, and if not, step S22 is skipped over, and the process is advanced to step S23. In step S22, a parameter calculation routine is executed, and in step S23, a blur correction routine is executed. The parameter calculation routine and the blur correction routine are invoked as subroutines during execution of the blur correction image processing module. Programs of the parameter calculation routine and the blur correction routine are both incorporated in the image processing program 2.

In the parameter calculation routine of step S22, a parameter for use in the blur correction routine of step S23 is calculated. In the present embodiment, a point spread function (PSF) is calculated as the parameter for the blur correction routine.

As can be seen from FIGS. 5 and 6, the blur correction routine of step S23 is executed on each frame contained in the selected frame group, whereas the parameter calculation routine of step S22 is executed on only the first frame of all the frames contained in the selected frame group. That is to say, only an image processing unit 41-1 calculates the PSF, and image processing units 41-2, 41-3, ... do not calculate a PSF. Accordingly, when the blur correction routine is repeatedly executed, even though a PSF is necessary for each frame contained in the selected frame group, the PSF is calculated only once. Thus, in the present embodiment, during execution of the blur correction routine, the PSF for the first frame is also used as PSFs for the remaining frames contained in the selected frame group as will be described later.

In the present embodiment, the PSF is calculated in the following manner. In the present embodiment, the PSF is a function that approximates defocusing of the target frame, and the PSF is modeled as a function below, assuming that it conforms to a Gaussian distribution.

$$h(x,y)=(1/2\pi\sigma^2)\exp\{-(x^2+y^2)/2\sigma^2\} \qquad \text{(Formula 1)}$$

Here, $h(x,y)$ is the PSF, $x,y$ is an orthogonal coordinate system of a spatial domain of the target frame, $\pi$ is the ratio of the circumference of a circle to its diameter, and $\sigma$ is a standard deviation. The standard deviation $\sigma$ is a parameter indicating the extent of blurring of an image. It should be noted that as can be seen from Formula 1, calculating the PSF is equivalent to calculating the standard deviation $\sigma$, which is an unknown coefficient of the model formula of the PSF. Various methods are known as the method for calculating the standard deviation $\sigma$, and those skilled in the art can choose any method as appropriate, such as a method in which the standard deviation $\sigma$ is estimated from the range of change in the luminance value of an edge portion contained in the target frame. It should be noted that during calculation of the PSF in step S22, only the target frame of all the frames contained in the selected frame group is referred to, and the other frames are not referred to.

The blur correction routine of step S23 is the processing for reducing blurring contained in the target frame and enhancing edges. In step S23, the Lth image processing unit 41-L executes the blur correction routine on the target frame using the PSF (more precisely, the standard deviation σ in the present embodiment) that has been calculated in step S22. That is to say, the Lth image processing unit 41-L estimates the target frame before being blurred based on the PSF. Specifically, in the present embodiment, the Lth image processing unit 41-L has a frame G(u,v) that is the Fourier transform of a target frame g(x,y) pass through an inverse filter $H_{inv}(u,v)$ that is the inverse of a function H(u,v) obtained by Fourier transforming h(x,y), which is the PSF, and obtains the inverse Fourier transform of a frame F(u,v) that has passed through the inverse filter $H_{inv}(u,v)$, thereby generating an original frame f(x,y) in which blurring is reduced. It should be noted that u,v is an orthogonal coordinate system of a frequency domain of the target frame. This algorithm is based on Formula 2 below.

$$F(u,v)=H_{inv}(u,v)G(u,v) \qquad \text{(Formula 2)}$$

In the above-described manner, when processing of step S2 is finished with respect to all the frames contained in the selected frame group, the blur correction process illustrated in FIG. 5 is completed.

3. Applications

As described above, irrespective of whether the image processing program 2 captures image data from a still image file or a moving image file, the image processing program 2 thereafter manages the captured data as a still image file group. Therefore, the image processing program 2 can easily meet the user's request to perform image processing as desired by him/her on any frame in the same timeline. Moreover, the image processing program 2 has a function of reproducing the still image file group as a moving image. Consequently, even though the image data is treated as the still image file group in the image processing program 2, the user can recognize that image data as a moving image. Therefore, the image processing program 2 is particularly useful in instances where a moving image is analyzed, edited, and so on.

The image processing program 2 can deal with image processing of various kinds of moving images, and can be used, for example, in order for an organization such as the police to analyze a monitoring image from a security camera for investigation of a case. For example, there are cases where a suspect is recorded in a monitoring image from a security camera. However, usually, security cameras are seldom focused on the subject (suspect), and important images are often unclear. The blur correction function of the present embodiment is particularly useful in rapidly sharpening an unclear image group which is contained in a monitoring image from a security camera and in which defocusing or the like occurs.

4. Features

4-1

According to the above-described embodiment, the image processing unit 41 calculates a point spread function (PSF), which serves as the parameter of the blur correction routine, based on the first frame of all the frames contained in the selected frame group, and executes the blur correction routine on the first frame using the PSF. Moreover, the image processing unit 41 also executes the blur correction routine on the frames after the first frame contained in the selected frame group using the same PSF.

That is to say, a common PSF for all the frames contained in the selected frame group is calculated from only the first frame of all the frames. In other words, a PSF that has been calculated from the first frame for the blur correction routine to be executed on the first frame is used as it is as PSFs for the blur correction routine to be executed on the second and subsequent frames. This means that processing for calculating the PSFs from the second and subsequent frames for the blur correction routine to be executed on the second and subsequent frames is omitted. Accordingly, computation time taken to execute the same blur correction routine on a plurality of frames is reduced.

4-2

The extent of blurring of an image may depend on the properties of lenses of a camera, such as defocusing. Therefore, the extent of blurring estimated from a certain frame can be applied to another frame if the frames have been taken by the same camera. According to the above-described embodiment, the extent of blurring of the first frame contained in the selected frame group that has been estimated from the first frame is used to execute the blur correction routine on not only the first frame but also the second and subsequent frames. Thus, by selecting a plurality of frames taken under similar conditions, for example, when the same camera was used to take the frames, as the selected frame group, the user can obtain appropriate images in which blurring are reduced while increasing the speed of the blur correction process executed on those frames.

4-3

In many cases, it may be appropriate to execute the same image processing using the same parameter on a plurality of frames that is at least a part of frames belonging to the same timeline. This is because those frames are highly likely to have been taken under similar conditions. According to the above-described embodiment, it is possible to execute the blur correction routine using the same PSF on the selected frame group containing a plurality of frames on the same timeline. Accordingly, it is possible to obtain appropriate images in which blurring are reduced while increasing the speed of the blur correction process.

5. Variations

Although an embodiment of the present invention has been described above, the present invention is not limited to the above embodiment, and various changes can be made thereto without departing from the gist of the present invention. For example, the following changes can be made.

5-1

In step S22, the parameter was calculated from the leading frame on the timeline of all the frames contained in the selected frame group; however, the parameter may also be calculated from a frame other than the leading frame. For example, the frame based on which the parameter is calculated may be freely designated by the user, or may be automatically specified in accordance with a predetermined algorithm in which a frame other than the leading frame may be selected.

5-2

In step S22, the parameter was calculated from only a single frame of all the frames contained in the selected frame group; however, the parameter may also be calculated from two or more frames. For example, it is also possible to calculate the parameter from only the first and second frames on the timeline of all the frames contained in the selected frame group and use this parameter for the blur correction routine of not only the first and second frames but also the third and subsequent frames.

5-3

In the above-described embodiment, processing of step S23 executed on all the frames contained in the selected frame group was sequential processing; however, processing of step S23 may also be parallel processing. For example, it is also possible that after the parameter is calculated in step S22, the image processing units 41-1, 41-2, . . . respectively execute processing of step S23 on different frames in parallel.

5-4

The above-described embodiment was configured so that the selected frame group, which is the target of execution of an image processing module, can only be selected from frames on the same timeline; however, it is also possible that the selected frame group can be selected from frames on different timelines.

Generally, there are cases where it is appropriate to execute the same image processing using the same parameter on a plurality of frames belonging to different timelines. For example, this holds in the case where those frames have been taken by the same camera installed at the same location. According to this variation, it is possible to execute the blur correction routine using the same PSF on a selected frame group containing a plurality of frames belonging to different timelines. Therefore, it is possible to obtain appropriate images in which blurring are reduced while increasing the speed of the blur correction process.

5-5

The above-described embodiment was configured so that the standard deviation σ of the PSF is calculated as the parameter for use in the blur correction routine to be executed on a plurality of frames; however, another parameter indicating the extent of blurring may also be calculated. For example, it is also possible to model the PSF as a function other than a Gaussian function and calculate another parameter contained in that model. Alternatively, an indicator other than the PSF may be used as the parameter indicating the extent of blurring.

5-6

The above-described embodiment was configured so that the blur correction routine is executed as image processing of step S23 in which the parameter calculated in step S22 is shared among a plurality of frames; however, other image processing may also be executed. It should be noted that naturally, if image processing of step S23 changes, the parameter that should be calculated in step S22 also changes.

For example, it is also possible that in step S23, processing for removing noise or processing for adding noise is executed, and in step S22, noise information (parameter) of a noise removal filter, a noise addition filter, or the like is calculated from a specific frame of the selected frame group.

Alternatively, it is possible that in step S23, processing for correcting for distortion aberration is executed, and in step S22, information (parameter) indicating the extent of distortion aberration such as a distortion factor is calculated from a specific frame of the selected frame group.

Alternatively, it is possible that in step S23, processing for correcting for peripheral illumination is executed, and in step S22, information (parameter) that has an influence on the extent of peripheral illumination such as the angle of view is calculated from a specific frame of the selected frame group.

5-7

Figure 7:
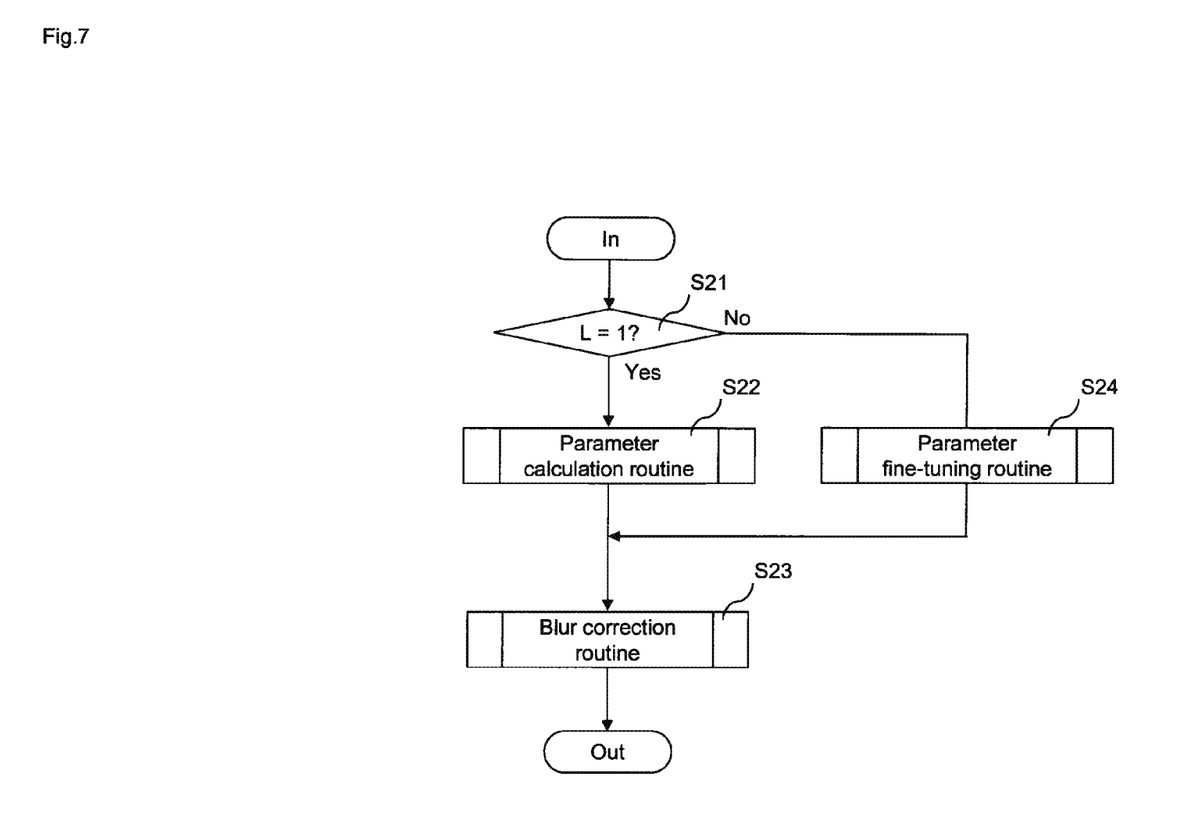
FIG. 7 is a flowchart of a blur correction process to be executed on each frame according to a variation.

The above-described embodiment was configured so that the parameter calculated from the first frame of all the frames contained in the selected frame group is used as it is as not only the parameter for the first frame but also parameters for the remaining frames. However, the method for making use of the parameter for the first frame for image processing of the remaining frames is not limited to this. For example, during image processing of the remaining frames, the parameter calculated from the first frame may be fine-tuned using information on the remaining frames so as to become more appropriate as the parameters for the remaining frames. According to this variation, processing for calculating the parameters for the remaining frames is simplified, and computation time taken to execute the same image processing on all the frames is reduced. When this variation is applied to step S2 of the above-described embodiment, for example, processing of step S2 illustrated in FIG. 6 may be changed to processing as illustrated in FIG. 7. That is to say, the processing may be changed so that with respect to frames other than the first frame, instead of step S22, in which the parameter is calculated from the beginning, step S24 is executed in which the parameter that has already been calculated in step S22 is fine-tuned.

5-8

The above-described embodiment was configured so that any image data captured into the original image region 51 is stored as a still image file. However, it is also possible to store the image data captured into the original image region 51 as a moving image file. Whether the image data in the original image region 51 is stored in a still image format or a moving image format may be user-selectable or may be automatically determined according to the format or the like of the source image data.

Furthermore, after that, if the moving image file is subjected to image processing, the image data after this image processing may also be stored in the format of the moving image file.

What is claimed is:

1. An image processing apparatus comprising:
   an instruction receiving unit configured to receive an instruction to execute image processing on a first image and a second image;
   a first image processing unit configured to calculate a parameter for the image processing based on the first image, but not based on the second image, and execute the image processing on the first image using the parameter in response to the instruction; and
   a second image processing unit configured to execute the image processing on the second image using the parameter when the parameter has been calculated.

2. The image processing apparatus according to claim 1, wherein the first image and the second image are images on the same timeline.

3. The image processing apparatus according to claim 2, wherein the parameter includes an extent of blurring, and the image processing includes processing for enhancing an edge.

4. The image processing apparatus according to claim 2, wherein the parameter includes at least one of noise information, distortion aberration information, and peripheral illumination information, and
   the image processing includes at least one of processing for removing noise, processing for adding noise, processing for correcting for distortion aberration, and processing for correcting for peripheral illumination.

5. The image processing apparatus according to claim 1, wherein the first image and the second image are images on different timelines.

6. The image processing apparatus according to claim 5, wherein the parameter includes an extent of blurring, and the image processing includes processing for enhancing an edge.

7. The image processing apparatus according to claim 5, wherein the parameter includes at least one of noise information, distortion aberration information, and peripheral illumination information, and the image processing includes at least one of processing for removing noise, processing for adding noise, processing for correcting for distortion aberration, and processing for correcting for peripheral illumination.

8. The image processing apparatus according to claim 1, wherein the parameter includes an extent of blurring, and the image processing includes processing for enhancing an edge.

9. The image processing apparatus according to claim 1, wherein the parameter includes at least one of noise information, distortion aberration information, and peripheral illumination information, and
the image processing includes at least one of processing for removing noise, processing for adding noise, processing for correcting for distortion aberration, and processing for correcting for peripheral illumination.

10. A non-transitory computer-readable recording medium storing an image processing program configured to cause a computer to execute steps of:
receiving an instruction to execute image processing on a first image and a second image;
calculating a parameter for the image processing based on the first image, but not based on the second image, and executing the image processing on the first image using the parameter in response to the instruction; and
executing the image processing on the second image using the parameter when the parameter has been calculated.

11. The non-transitory computer-readable recording medium according to claim 10,
wherein the parameter includes an extent of blurring, and the image processing includes processing for enhancing an edge.

12. The non-transitory computer-readable recording medium according to claim 10,
wherein the parameter includes at least one of noise information, distortion aberration information, and peripheral illumination information, and
the image processing includes at least one of processing for removing noise, processing for adding noise, processing for correcting for distortion aberration, and processing for correcting for peripheral illumination.

13. A method of image processing, comprising steps of:
receiving an instruction to execute image processing on first image and a second image,
calculating a parameter for the image processing based on the first image, but not based on second image, and executing the image processing on the first image using the parameter in response to the instruction; and
executing the image processing on the second image using the parameter when the parameter has been calculated.

14. The method of image processing according to claim 13, wherein the parameter includes an extent of blurring, and the image processing includes processing for enhancing an edge.

15. The method of image processing according to claim 13, wherein the parameter includes at least one of noise information, distortion aberration information, and peripheral illumination information, and
the image processing includes at least one of processing for removing noise, processing for adding noise, processing for correcting for distortion aberration, and processing for correcting for peripheral illumination.

* * * * *